United States Patent
Gilger

[11] Patent Number: 5,966,241
[45] Date of Patent: Oct. 12, 1999

[54] COMPUTER MONITOR VISOR

[76] Inventor: Paul Gilger, 530 Juilliard Park Dr., Santa Rosa, Calif. 95401

[21] Appl. No.: 09/070,570

[22] Filed: Apr. 30, 1998

[51] Int. Cl.$^6$ .................................................. G02B 27/00
[52] U.S. Cl. .......................... 359/609; 359/601; 359/612
[58] Field of Search ........................... 359/601, 608–609, 359/612–614, 408, 474, 466–467, 480–482, 808–812, 816–817, 819; 348/834–842; 313/478; 361/681–685, 737; 40/365; 248/205.3, 442.2, 918

[56] References Cited

U.S. PATENT DOCUMENTS

| | | | |
|---|---|---|---|
| 2,209,668 | 7/1940 | Thornton, Jr. | 40/365 |
| 5,069,529 | 12/1991 | Takahashi | 359/601 |
| 5,233,468 | 8/1993 | McNulty | 359/614 |
| 5,243,463 | 9/1993 | Waintroob | 359/609 |
| 5,369,332 | 11/1994 | Droscha | 359/609 |

FOREIGN PATENT DOCUMENTS

| | | | |
|---|---|---|---|
| 677165 | 8/1952 | United Kingdom | 359/612 |

*Primary Examiner*—Thong Nguyen

[57] ABSTRACT

A new computer monitor visor for shielding a user's eyes from direct ambient light while viewing a video display device such as a computer video monitor. The inventive device includes a generally rectangular sheet having first and second fold lines and first, second, and third score lines which divide the sheet into first and second trapezoidal panels, and a pair of triangular panels. The second trapezoidal panel is separable from the sheet along the score lines of the sheet such that the score line define a generally trapezoidal cutout. The sheet is foldable along the first and second fold lines such that the triangular panels generally face one another.

15 Claims, 2 Drawing Sheets

COMPUTER MONITOR VISOR

BACKGROUND OF THE INVENTION

1. Field of the Invention

The present invention relates to devices for shielding a user's eyes from ambient light and more particularly pertains to a new computer monitor visor for shielding a user's eyes from direct ambient light while viewing a video display device such as a computer video monitor.

2. Description of the Prior Art

The use of devices for shielding a user's eyes from ambient light is known in the prior art. More specifically, devices for shielding a user's eyes from ambient light heretofore devised and utilized are known to consist basically of familiar, expected and obvious structural configurations, notwithstanding the myriad of designs encompassed by the crowded prior art which have been developed for the fulfillment of countless objectives and requirements.

Known prior art devices for shielding a user's eyes from ambient light include U.S. Pat. No. 5,121,253; U.S. Pat. No. 5,233,468; U.S. Pat. No. Des. 311,912; U.S. Pat. No. 4,863,242; U.S. Pat. No. 5,069,529; and U.S. Pat. No. 5,115,345.

While these devices fulfill their respective, particular objectives and requirements, the aforementioned patents do not disclose a new computer monitor visor. Typically, prior art devices are designed to block glare from light reflected on the screen of the monitor. These prior art devices do not provide any blocking of ambient light, such as sunlight through a window and light from fixtures, from shining directly into the eyes of a user sitting in front of the video monitor.

In these respects, the computer monitor visor according to the present invention substantially departs from the conventional concepts and designs of the prior art, and in so doing provides an apparatus primarily developed for the purpose of shielding a user's eyes from direct ambient light while viewing a video display device such as a computer video monitor.

SUMMARY OF THE INVENTION

In view of the foregoing disadvantages inherent in the known types of devices for shielding a user's eyes from ambient light now present in the prior art, the present invention provides a new computer monitor visor construction wherein the same can be utilized for shielding a user's eyes from direct ambient light while viewing a video display device such as a computer video monitor.

The general purpose of the present invention, which will be described subsequently in greater detail, is to provide a new computer monitor visor apparatus and method which has many of the advantages of the devices for shielding a user's eyes from ambient light mentioned heretofore and many novel features that result in a new computer monitor visor which is not anticipated, rendered obvious, suggested, or even implied by any of the prior art devices for shielding a user's eyes from ambient light, either alone or in any combination thereof.

To attain this, the present invention generally comprises a generally rectangular sheet having first and second fold lines and first, second, and third score lines which divide the sheet into first and second trapezoidal panels, and a pair of triangular panels. The second trapezoidal panel is separable from the sheet along the score lines of the sheet such that the score line define a generally trapezoidal cutout. The sheet is foldable along the first and second fold lines such that the triangular panels generally face one another.

It is therefore an object of the present invention to provide a new computer monitor visor apparatus and method which has many of the advantages of the devices for shielding a user's eyes from ambient light mentioned heretofore and many novel features that result in a new computer monitor visor which is not anticipated, rendered obvious, suggested, or even implied by any of the prior art devices for shielding a user's eyes from ambient light, either alone or in any combination thereof.

It is another object of the present invention to provide a new computer monitor visor which may be easily and efficiently manufactured and marketed.

It is a further object of the present invention to provide a new computer monitor visor which is of a durable and reliable construction.

An even further object of the present invention is to provide a new computer monitor visor which is susceptible of a low cost of manufacture with regard to both materials and labor, and which accordingly is then susceptible of low prices of sale to the consuming public, thereby making such computer monitor visor economically available to the buying public.

Still yet another object of the present invention is to provide a new computer monitor visor which provides in the apparatuses and methods of the prior art some of the advantages thereof, while simultaneously overcoming some of the disadvantages normally associated therewith.

Still another object of the present invention is to provide a new computer monitor visor for shielding a user's eyes from direct ambient light while viewing a video display device such as a computer video monitor.

Yet another object of the present invention is to provide a new computer monitor visor which includes a generally rectangular sheet having first and second fold lines and first, second, and third score lines which divide the sheet into first and second trapezoidal panels, and a pair of triangular panels. The second trapezoidal panel is separable from the sheet along the score lines of the sheet such that the score line define a generally trapezoidal cutout. The sheet is foldable along the first and second fold lines such that the triangular panels generally face one another.

Still yet another object of the present invention is to provide a new computer monitor visor that blocks direct ambient light, such as sunlight through a window and light from light fixtures, from shining directly into the eyes of a user sitting in front of a video display monitor such as a computer monitor.

Even still another object of the present invention is to provide a new computer monitor visor that by blocking direct glare from over head light fixtures and sunlight helps reduce strain on a user's eyes and helps the user's concentration while viewing a video display monitor.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
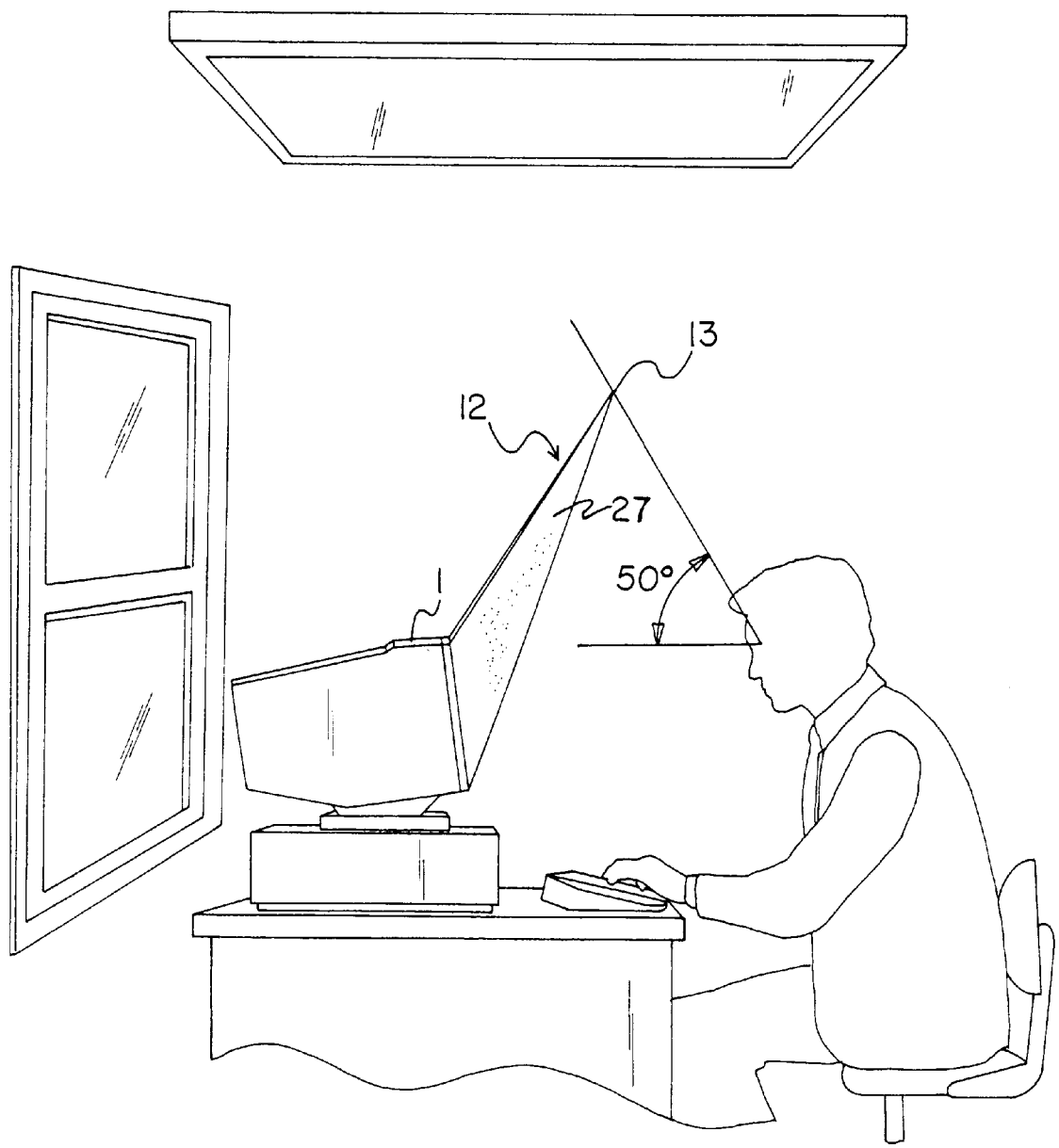
FIG. 1 is a schematic side view of the present invention in use.

With reference now to the drawings, and in particular to FIGS. 1 through 5 thereof, a new computer monitor visor embodying the principles and concepts of the present invention and generally designated by the reference numeral 10 will be described.

The computer monitor visor 10 is designed for attachment to the front of a video display monitor 1 for helping block light (including sunlight through windows and from overhead ambient lighting) from directly shining into the eyes of a user of the video display monitor 1. The front of the video display monitor 1 is generally rectangular and has a top and a pair of sides. As best illustrated in FIGS. 1 through 5, the computer monitor visor 10 generally comprises a generally rectangular sheet 12 having first and second fold lines 18,19 and first, second, and third score lines 21,22,23 which divide the sheet 12 into first and second trapezoidal panels 25,26, and a pair of triangular panels 27,28. The second trapezoidal panel 26 is separable from the sheet 12 along the score lines 21,22,23 of the sheet 12 such that the score line define a generally trapezoidal cutout. The sheet 12 is foldable along the first and second fold lines 18,19 such that the triangular panels 27,28 generally face one another.

In closer detail, the sheet 12 has substantially flat first and second surfaces. The sheet 12 is preferably generally rectangular and has four corners, a pair of generally straight end edges 13,14 and a pair of generally straight side edges 15,16 extending between the end edges 13,14 of the sheet 12. The sheet 12 has a length defined between the end edges 13,14 of the sheet 12 and a width defined between the side edges 15,16 of the sheet 12. Preferably, the width of the sheet 12 is less than about two-thirds the length of the sheet 12. In an ideal illustrative embodiment, the length of the sheet 12 is less than about 3 feet and the width of the sheet 12 is less than about 2 feet.

Figure 2:
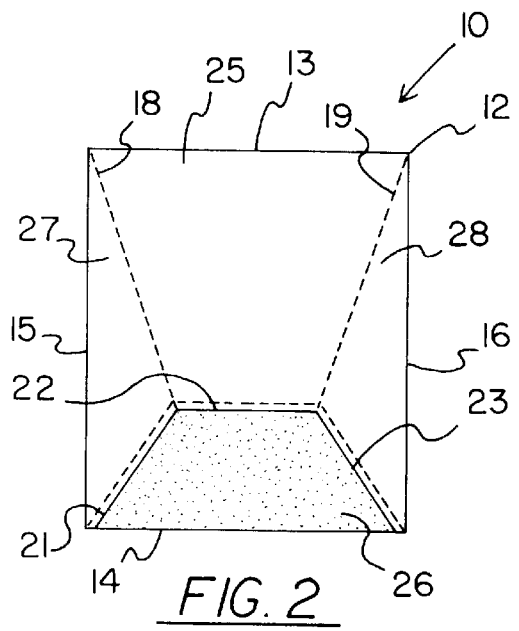
FIG. 2 is a schematic first side view of a new computer monitor visor according to the present invention.

As illustrated in FIG. 2, the sheet 12 has generally straight first and second fold lines 18,19 and generally straight first, second, and third score lines 21,22,23. The fold lines 18,19 and score lines 21,22,23 divide the sheet 12 into first and second trapezoidal panels 25,26, and a pair of triangular panels 27,28. The first trapezoidal panel 25 is positioned adjacent one of the end edges 13 of the sheet 12 and the second trapezoidal panel 26 is positioned adjacent another of the end edges 14 of the sheet 12. One of the triangular panels 27 is positioned adjacent one of the side edges 15 of the sheet 12 while the other triangular panel 28 is positioned adjacent the other side edge 16 of the sheet 12. Preferably, the second score line 22 is extended generally parallel with the end edges 13,14 of the sheet 12. The first trapezoidal panel 25 has a length defined between the one end edge 13 of the sheet 12 and the second score line 22. Ideally, the length of the first trapezoidal panel 25 is less than about two-thirds the length of the sheet 12. In the ideal illustrative embodiment, the length of the first trapezoidal panel 25 is less than about 2 feet.

Figure 3:
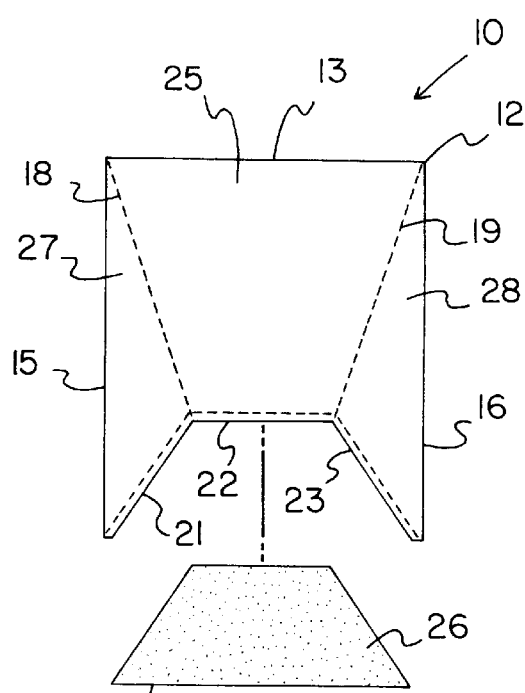
FIG. 3 is a schematic side view of the present invention with the second trapezoidal panel separated from the sheet.
Figure 4:
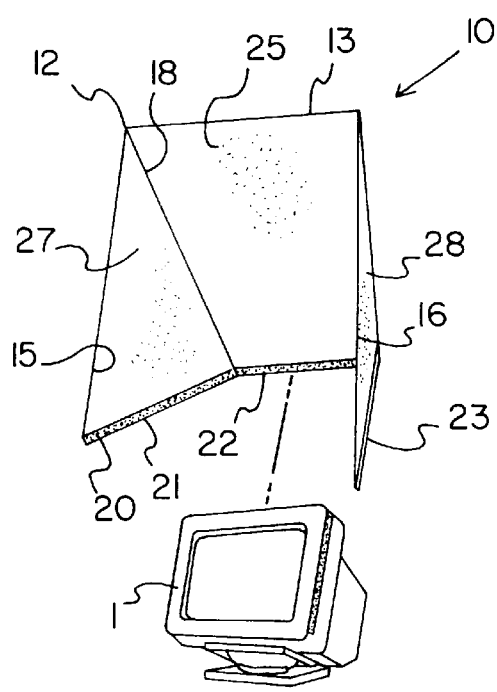
FIG. 4 is a schematic second surface perspective view of the present invention indicating the location of attachment on the front of a computer monitor.
Figure 5:
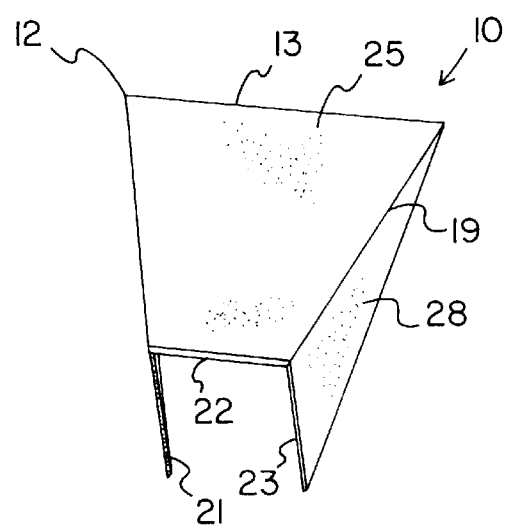
FIG. 5 is a schematic perspective view of the present invention with the triangular panels folded into position.

With reference to FIG. 3, the second trapezoidal panel 26 is separable from the sheet 12 along the score lines 21,22,23 of the sheet 12 such that the score line define a generally trapezoidal cutout. Optionally, each of the score lines 21,22, 23 may include perforations therethrough between the first and second surfaces of the sheet 12 for aiding separation of the second trapezoidal panel 26 from the sheet 12. With reference to FIG. 4, the second side of the sheet 12 preferably has an adhesive 20, such as a pressure adhesive strip, provided along the score lines 21,22,23. The adhesive 20 is designed for adhesively attaching the sheet 12 to the front of a video display monitor 1.

As illustrated in FIGS., 4 and 5, the sheet 12 is foldable along the first and second fold lines 18,19 such that the triangular panels 27,28 generally face one another. Preferably, the triangular panels 27,28 lie in planes extending in a generally perpendicular direction to the plane the first trapezoidal panel 25 lies in when the sheet 12 is folded along the first and second fold lines 18,19. As illustrated in FIGS. 1 and 4, the second surface of the sheet 12 is attachable to the front of a video display monitor 1 such that the first trapezoidal panel 25 is positioned adjacent the top of the front of the video display monitor 1 and the triangular panels 27,28 are positioned adjacent associated sides of the front of the video display monitor 1. Ideally, the first trapezoidal panel 25 is upwardly and forwardly extended from the top of the front of a video display monitor 1 when the sheet 12 is attached to the front of the video display monitor 1. With reference to FIG. 1, ideally the trapezoidal portion blocks light shining at an angle towards the front of the video display monitor 1 from the back of the video display monitor 1 of less than about 50 degrees from the horizon as measured from the eyes of a user. Also ideally, the triangular panels 27,28 are outwardly and forwardly extended from associated sides of the front of a video display monitor 1 when the sheet 12 is attached to the front of the video display monitor 1.

In use, the computer monitor visor 10 blocks light from directly shining into the eyes of a user of the video display monitor 1. The second trapezoidal panel 26 is separated from the sheet 12 along the score lines 21,22,23 of the sheet 12 such that the score line define a generally trapezoidal cutout. If the sheet has perforations, the second trapezoidal panel 26 may be easily torn off of the sheet along the score lines 21,22,23. The sheet 12 is then folded along the first and second fold lines 18,19 such that the triangular panels 27,28 generally face one another. The sheet may then be attached, ideally by adhesive attachment, to the front of the video display monitor 1 such that the first trapezoidal panel 25 is positioned adjacent the top of the front of the video display monitor 1 and the triangular panels 27,28 are positioned adjacent associated sides of the front of the video display monitor 1. The sheet is positioned on the video display monitor such that first trapezoidal panel 25 is upwardly and forwardly extended from the top of the front of a video display monitor 1 when the sheet 12 is attached to the front of the video display monitor 1, and the triangular panels 27,28 are outwardly and forwardly extended from associated sides of the front of a video display monitor 1 when the sheet 12 is attached to the front of the video display monitor 1.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

It is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

I claim:

1. An attachment for attachment to the front of a video display monitor, the front of the video display monitor having a top and a pair of sides, said attachment comprising:

a sheet being generally rectangular and having first and second surfaces, a pair of end edges and a pair of side edges extending between said end edges of said sheet;

said sheet having first and second fold lines and first, second, and third score lines;

said fold lines and score lines dividing said sheet into first and second trapezoidal panels, and a pair of triangular panels;

said first trapezoidal panel being positioned adjacent one of said end edges of said sheet, said second trapezoidal panel being positioned adjacent another of said end edges of said sheet;

one of said triangular panels being positioned adjacent one of said side edges of said sheet, another of said triangular panels being positioned adjacent another of said side edges of said sheet;

said second score line being extended generally parallel with said end edges of said sheet;

said second trapezoidal panel being separable from said sheet along said score lines of said sheet such that said score lines define a generally trapezoidal cutout; and said sheet being foldable along said first and second fold lines such that said triangular panels generally face one another.

2. The attachment of claim 1, wherein said sheet has a length defined between said end edges of said sheet, wherein said sheet has a width defined between said side edges of said sheet, wherein said width of said sheet is less than about two-thirds said length of said sheet.

3. The attachment of claim 2, wherein said length of said sheet is less than about 3 feet, wherein said width of said sheet is less than about 2 feet.

4. The attachment of claim 2, wherein said first trapezoidal panel has a length defined between said one end edge of said sheet and said second score line, wherein said length of said first trapezoidal panel is less than about two-thirds said length of said sheet.

5. The attachment of claim 4, wherein said length of said first trapezoidal panel is less than about 2 feet.

6. The attachment of claim 1, wherein each of said score lines have perforations therethrough for aiding separation of said second trapezoidal panel from said sheet.

7. The attachment of claim 1, wherein said second side of said sheet has an adhesive provided along said score lines, said adhesive being for adhesively attaching said sheet to the front of a video display monitor.

8. The attachment of claim 1, wherein said triangular panels lie in planes extending in a generally perpendicular direction to the plane said first trapezoidal panel lies in when said sheet is folded along said first and second fold lines.

9. The attachment of claim 1, wherein said second surface of said sheet is attachable to the front of a video display monitor such that said first trapezoidal panel is positioned adjacent the top of the front of the video display monitor and said triangular panels are positioned adjacent associated sides of the front of the video display monitor.

10. The attachment of claim 9, wherein said first trapezoidal panel is upwardly and forwardly extended from the top of the front of a video display monitor when said sheet is attached to the front of the video display monitor, and wherein said triangular panels are outwardly and forwardly extended from associated sides of the front of a video display monitor when said sheet is attached to the front of the video display monitor.

11. An attachment for attachment to the front of a video display monitor for helping block light from directly shining into the eyes of a user of the video display monitor, the front of the video display monitor being generally rectangular and having a top and a pair of sides, said attachment comprising:

a sheet being generally rectangular and having substantially flat first and second surfaces, a pair of generally straight end edges and a pair of generally straight side edges extending between said end edges of said sheet;

wherein said sheet has a length defined between said end edges of said sheet, wherein said sheet has a width defined between said side edges of said sheet, wherein said width of said sheet is less than about two-thirds said length of said sheet, wherein said length of said sheet is less than about 3 feet, wherein said width of said sheet is less than about 2 feet;

said sheet having generally straight first and second fold lines and generally straight first, second, and third score lines;

said fold lines and score lines dividing said sheet into first and second trapezoidal panels, and a pair of triangular panels;

said first trapezoidal panel being positioned adjacent one of said end edges of said sheet, said second trapezoidal panel being positioned adjacent another of said end edges of said sheet;

one of said triangular panels being positioned adjacent one of said side edges of said sheet, another of said triangular panels being positioned adjacent another of said side edges of said sheet;

said second score line being extended generally parallel with said end edges of said sheet, wherein said first trapezoidal panel has a length defined between said one end edge of said sheet and said second score line, wherein said length of said first trapezoidal panel is less than about two-thirds said length of said sheet, wherein said length of said first trapezoidal panel is less than about 2 feet;

said second trapezoidal panel being separable from said sheet along said score lines of said sheet such that said score lines define a generally trapezoidal cutout;

wherein each of said score lines have perforations therethrough for aiding separation of said second trapezoidal panel from said sheet;

said second side of said sheet having an adhesive provided along said score lines, said adhesive being for adhesively attaching said sheet to the front of a video display monitor;

said sheet being foldable along said first and second fold lines such that said triangular panels generally face one another;

wherein said triangular panels lie in planes extending in a generally perpendicular direction to the plane said first trapezoidal panel lies in when said sheet is folded along said first and second fold lines;

wherein said second surface of said sheet is attachable to the front of a video display monitor such that said first trapezoidal panel is positioned adjacent the top of the front of the video display monitor and said triangular panels are positioned adjacent associated sides of the front of the video display monitor;

wherein said first trapezoidal panel is upwardly and forwardly extended from the top of the front of a video display monitor when said sheet is attached to the front of the video display monitor; and wherein said triangular panels are outwardly and forwardly extended from associated sides of the front of a video display monitor when said sheet is attached to the front of the video display monitor.

12. A method for blocking light from directly shining into the eyes of a user of the video display monitor, the front of the video display monitor being generally rectangular and having a top and a pair of sides, the method comprising the steps of:

providing an attachment comprising:
a sheet being generally rectangular and having first and second surfaces, a pair of end edges and a pair of side edges extending between said end edges of said sheet;

said sheet having first and second fold lines and first, second, and third score lines;

said fold lines and score lines dividing said sheet into first and second trapezoidal panels, and a pair of triangular panels;

said first trapezoidal panel being positioned adjacent one of said end edges of said sheet, said second trapezoidal panel being positioned adjacent another of said end edges of said sheet;

one of said triangular panels being positioned adjacent one of said side edges of said sheet, another of said second score line being extended generally parallel another of said side edges of said sheet;

said second score line being extended generally parallel with said end edges of said sheet;

separating said second trapezoidal panel from said sheet along said score lines of said sheet such that said score lines define a generally trapezoidal cutout;

folding said sheet along said first and second fold lines such that said triangular panels generally face one another; and attaching said second surface of said sheet to the front of the video display monitor such that said first trapezoidal panel is positioned adjacent the top of the front of the video display monitor and said triangular panels are positioned adjacent associated sides of the front of the video display monitor.

13. The method of claim 12, wherein each of said score lines have perforations therethrough for aiding separation of said second trapezoidal panel from said sheet, and wherein the step of separating said second trapezoidal panel from said sheet further includes the step of tearing said second trapezoidal panel along said score lines.

14. The method of claim 12, wherein the step of attaching said second surface of said sheet to the front of a video display monitor further comprises the steps of: providing an adhesive on said second side of said sheet along said score lines, and adhesively attaching said sheet to the front of a video display monitor.

15. The method of claim 12, wherein said first trapezoidal panel is upwardly and forwardly extended from the top of the front of a video display monitor when said sheet is attached to the front of the video display monitor, and wherein said triangular panels arc outwardly and forwardly extended from associated sides of the front of a video display monitor when said sheet is attached to the front of the video display monitor.

* * * * *